(12) United States Patent
Kim et al.

(10) Patent No.: US 11,259,173 B2
(45) Date of Patent: Feb. 22, 2022

(54) ELECTRONIC DEVICE INCLUDING EUICC AND METHOD FOR MANAGING PROFILE OF EUICC

(71) Applicant: Samsung Electronics Co., Ltd., Gyeonggi-do (KR)

(72) Inventors: Sung Oh Kim, Incheon (KR); Jeong Don Kang, Gyeonggi-do (KR); Sang Soo Lee, Gyeonggi-do (KR); Sang Hwi Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 493 days.

(21) Appl. No.: 16/318,054

(22) PCT Filed: Jul. 31, 2017

(86) PCT No.: PCT/KR2017/008250
§ 371 (c)(1),
(2) Date: Jan. 15, 2019

(87) PCT Pub. No.: WO2018/021897
PCT Pub. Date: Feb. 1, 2018

(65) Prior Publication Data
US 2021/0281998 A1    Sep. 9, 2021

(30) Foreign Application Priority Data

Jul. 29, 2016    (KR) .................. 10-2016-0096666

(51) Int. Cl.
*H04W 8/18*    (2009.01)
*H04W 8/20*    (2009.01)
(52) U.S. Cl.
CPC ........... *H04W 8/183* (2013.01); *H04W 8/205* (2013.01)

(58) Field of Classification Search
CPC ....... H04W 88/06; H04W 8/18; H04W 12/42; H04W 48/18; H04W 8/20; H04W 12/63;
(Continued)

(56) References Cited

U.S. PATENT DOCUMENTS 9,451,098 B2    9/2016   Zhu et al.
9,531,831 B1 *  12/2016  Cuadrat ................ H04W 8/183
(Continued)

FOREIGN PATENT DOCUMENTS

JP    2014171031       9/2014
KR    1020110037487    4/2011
(Continued)

OTHER PUBLICATIONS

PCT/ISA/210 Search Report issued on PCT/KR2017/008250, pp. 5.
PCT/ISA/237 Written Opinion issued on PCT/KR2017/008250, pp. 5.

*Primary Examiner* — Said M Elnoubi
(74) *Attorney, Agent, or Firm* — The Farrell Law Firm, P.C.

(57) ABSTRACT

Disclosed is an electronic device. The electronic device may comprise: at least one processor, an eUICC including a plurality of profiles; an RF circuit and a GPS circuit, for communicating with a network by using an activated first profile among the plurality of profiles; and a memory for storing a profile list database including information on the plurality of profiles. The at least one processor may implement a management module for managing the plurality of profiles, and the management module may deactivate the first profile and activate a second profile on the basis of location information acquired by the RF circuit or the GPS circuit. In addition, various embodiments understood through the specification are possible.

12 Claims, 11 Drawing Sheets

(58) Field of Classification Search
CPC .... H04W 12/72; H04W 36/14; H04L 67/303; H04L 67/306; H04L 63/102; H04L 67/30; H04M 17/103; H04M 15/8033; H04M 15/8038; H04M 2203/557
See application file for complete search history.

(56) References Cited

U.S. PATENT DOCUMENTS

| | | |
|---|---|---|
| 2004/0203900 A1 | 10/2004 | Cedervall et al. |
| 2006/0189328 A1 | 8/2006 | Cedervall et al. |
| 2011/0081951 A1* | 4/2011 | Hwang ................ H04W 8/183 455/558 |
| 2012/0165044 A1 | 6/2012 | Cedervall et al. |
| 2013/0281085 A1 | 10/2013 | Sen et al. |
| 2013/0310076 A1 | 11/2013 | Cedervall et al. |
| 2014/0295890 A1 | 10/2014 | Cedervall et al. |
| 2015/0304506 A1 | 10/2015 | Zhu et al. |
| 2017/0019846 A1* | 1/2017 | Su ........................ H04J 11/0069 |
| 2017/0156051 A1 | 6/2017 | Park et al. |

FOREIGN PATENT DOCUMENTS

| | | |
|---|---|---|
| KR | 1020110056164 | 5/2011 |
| KR | 1020160002326 | 1/2016 |
| KR | 1020160072641 | 6/2016 |

* cited by examiner

ELECTRONIC DEVICE INCLUDING EUICC AND METHOD FOR MANAGING PROFILE OF EUICC

PRIORITY

This application is a National Phase Entry of PCT International Application No. PCT/KR2017/008250 which was filed on Jul. 31, 2017, and claims priority to Korean Patent Application No. 10-2016-0096666, which was filed on Jul. 29, 2016, the content of each of which is incorporated herein by reference.

TECHNICAL FIELD

[1] The present disclosure relates to technologies of controlling an operation associated with enabling a profile of an electronic device loaded with an eUICC.

BACKGROUND ART

A user terminal such as a smartphone supports wireless communication. The user terminal may include a subscriber identity module (SIM) for identifying a user in a network.

Meanwhile, additionally or alternatively, an embedded SIM (eSIM) which is soldered in a terminal to be incapable of being inserted/separated may be used other than the SIM. The SIM/eSIM may be referred to as a universal integrated circuit card (UICC)/eUICC.

When a user terminal departs from a service coverage area of a mobile network operator, the mobile network operator may provide a communication service using (e.g., roaming) a network of another mobile network operator. When a plurality of profiles are installed in an eUICC, the user terminal may deliver current location information of the user terminal (e.g., PLMN information provided from a network, coordinate information capable of being obtained through a GPS, or the like) to the eUICC. The eUICC may compare information of the profiles installed in the eUICC with the transmitted location information and may select and enable a suitable profile.

DISCLOSURE

Technical Problem

When compared with a processor (e.g., an application processor (AP)) of a user terminal, an eUICC includes a very small memory and a controller of low performance. For reference, to clarify the meaning of terms and prevent confusion in the present disclosure, a processing unit included in the user terminal is referred to as a processor and a processing unit included in the eUICC is referred to as a controller.

Since the controller of the eUICC has low performance, a process of selecting and enabling one of installed profiles based on location information delivered to the eUICC may proceed slowly.

Furthermore, a plurality of profiles may be installed in the eUICC, and there may be a plurality of profiles corresponding to the provided location information. For example, in a state where a profile corresponding to a prepaid SIM purchased for a business trip to the USA is installed in the eUICC, when the user additionally purchases a prepaid SIM for USA, which provides a data service of 10 GB, due to a discount event of a mobile network operator or the like, there are profile 1 corresponding to the prepaid SIM previously installed and profile 2 corresponding to the SIM additionally purchased in the eUICC. At this time, when the user leaves for a business trip to the USA with his or her terminal, it is difficult for the eUICC to select a suitable profile between profile 1 and profile 2. Particularly, although the amount of remaining call (e.g., a CS call remaining time) and remaining data (e.g., a PS packet remaining amount) differ for each profile, since the eUICC is unable to determine real-time remaining usage for each profile and a user preference of a profile, it is difficult for the eUICC to select a profile having sufficient usage.

To address the above-mentioned problems and/or purposes disclosed in the present disclosure, an aspect of the present disclosure is to provide a method for effectively selecting and enabling a profile installed in an eUICC based on location information of a user terminal.

Technical Solution

In accordance with an aspect of the present disclosure, an electronic device is provided. The electronic device may include at least one processor, an eUICC configured to be electrically connected with the at least one processor and include a plurality of profiles, an RF circuit configured to communicate with a network using a first profile enabled among the plurality of profiles, a GPS circuit, and a memory storing a profile list database including information about the plurality of profiles. The at least one processor may implement a management module for managing the plurality of profiles. The management module may disable the first profile and may enable a second profile among the plurality of profiles, based on location information obtained by the RF circuit or the GPS circuit.

In accordance with another aspect of the present disclosure, a method for enabling a profile in an electronic device is provided. The method may include obtaining location information of the electronic device, when the location information does not correspond to a first profile which is enabled in an eUICC of the electronic device, obtaining information about at least one profile corresponding to the location information from a memory of the electronic device, the memory being independent of the eUICC, and disabling the first profile and enabling a second profile among the at least one profile.

In accordance with another aspect of the present disclosure, an electronic device is provided. The electronic device may include an application processor, a GPS circuit configured to be electrically connected with the application processor, a communication processor, an RF circuit configured to be electrically connected with the communication processor, an eUICC configured to be electrically connected with the communication processor and store a plurality of profiles, and a memory storing a profile list database including information about the plurality of profiles. The communication processor may provide a command to enable a profile corresponding to location information among the plurality of profiles to the eUICC based on the location information obtained by the RF circuit or the GPS circuit and the profile list database.

Advantageous Effects

According to embodiments disclosed in the present disclosure, a profile used for a communication function may be quickly changed by efficiently using hardware resources of a user terminal.

Furthermore, the user terminal may determine an optimal profile based on a user preference, real-time usage of a profile, location information of the terminal, or the like.

In addition, various effects directly or indirectly ascertained through the present disclosure may be provided.

MODE FOR INVENTION

Figure 1:
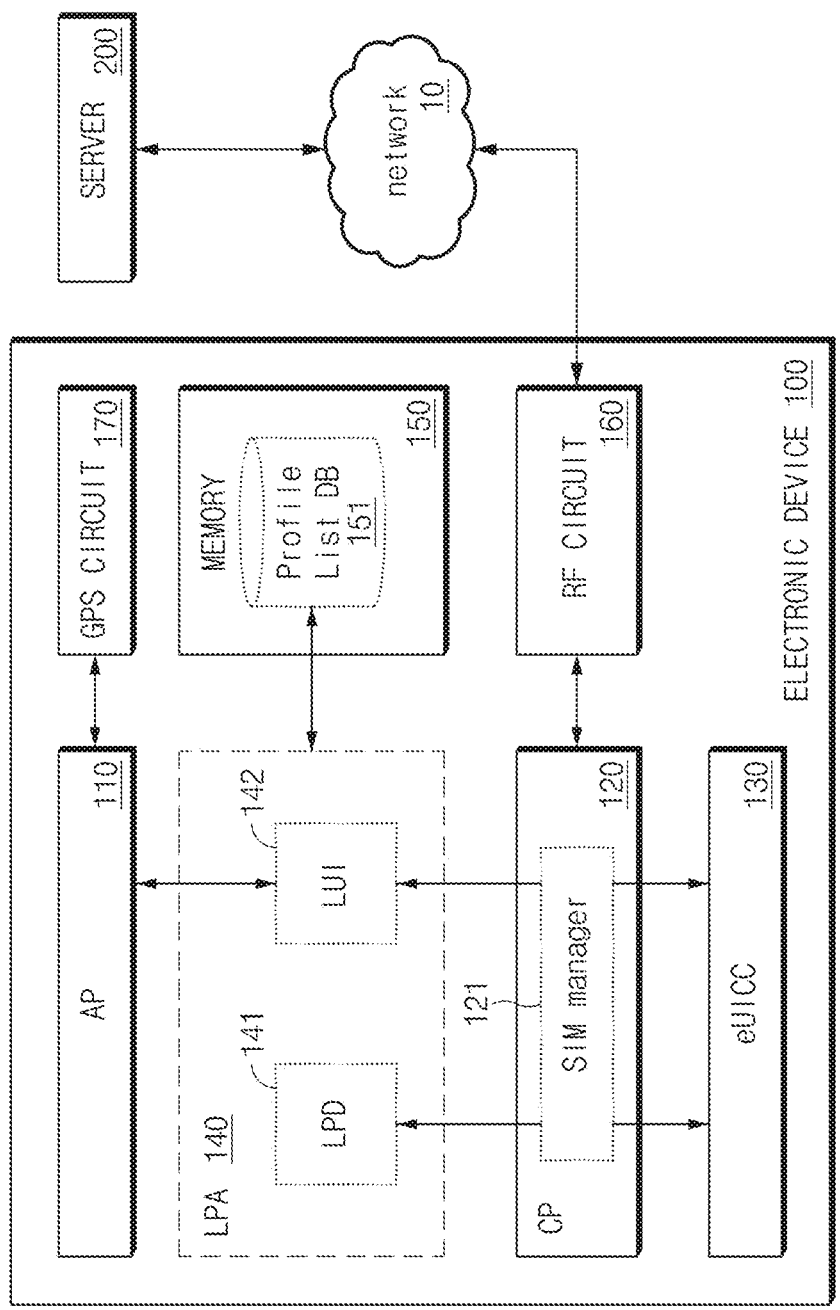
FIG. 1 illustrates hardware and software modules of an electronic device according to an embodiment.

Hereinafter, various embodiments of the present disclosure are disclosed with reference to the accompanying drawings. However, the present disclosure is not intended to be limited by the various embodiments of the present disclosure to a certain embodiment, but it is intended that the present disclosure covers all modifications, equivalents, and/or alternatives of the present disclosure within the scope of the appended claims and their equivalents. With respect to the descriptions of the accompanying drawings, like reference numerals refer to like elements.

The terms "include," "comprise," and "have", or "may include," or "may comprise" and "may have" used herein indicate disclosed functions, operations, or the existence of elements but does not exclude other functions, operations or elements.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

For example, the expressions "A or B" and "at least one of A and/or B" may indicate A and B, A, or B. For instance, the expressions "A or B" and "at least one of A and/or B" may indicate (1) at least one A, (2) at least one B, and (3) both at least one A and at least one B.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed by" another component (for example, a second component), another component (for example, a third component) does not exist between the component (for example, the first component) and the other component (for example, the second component).

The expression "configured to" used in the present disclosure may be interchangeably used with the expressions "suitable for," "having the capacity to," "designed to," "adapted to," "made to," and "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

Terms used in various embodiments of the present disclosure are used to describe certain embodiments of the present disclosure, but are not intended to limit the scope of the present disclosure. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meanings of the related art, and unless clearly defined herein, should not be understood differently or as having an excessively formal meaning. In any case, even the terms defined in the present disclosure are not intended to be interpreted as excluding embodiments of the present disclosure.

An electronic device according to an embodiment of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In an embodiment of the present disclosure, an electronic device may be a home appliance. A smart home appliance may include at least one of, for example, a television (TV), a digital video/versatile disc (DVD) player, an audio player, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame.

In an embodiment of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA) device, a magnetic resonance imaging (MRI) device, a computed tomography (CT) device, a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automated teller machine (ATM), a point of sales (POS) device of a store, or an Internet of Things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to an embodiment of the present disclosure, an electronic device may include at least one of a part of furniture or a building/structure, an electronic board, an electronic signature receiving device, a projector, and a measuring instrument (e.g., a water meter, an electricity meter, a gas meter, a wave meter, and the like). An electronic device may be one or more combinations of the above-mentioned devices. An electronic device according may be a flexible device. An electronic device is not limited to the above-mentioned devices, but may include newly developed electronic devices.

Hereinafter, an electronic device according to various embodiments of the present disclosure are described in more detail with reference to the accompanying drawings. The term "user" used herein may refer to a person who uses an electronic device or may refer to a device (e.g., an artificial intelligence electronic device) that uses an electronic device.

FIG. 1 illustrates hardware and software modules of an electronic device according to an embodiment.

Referring to FIG. 1, according to various embodiments, an electronic device 100 may include an application processor (AP) 110, a communication processor (CP) 120, an eUICC 130, a memory 150, a radio frequency (RF) circuit 160, and a GPS circuit 170. The electronic device 100 shown in FIG. 1 may be one example of a terminal for implementing various embodiments. The terminal may fail to include some of the components of the electronic device 100, or may further include other components.

The electronic device 100 may be understood as being a user terminal, a user device, user equipment (UE), a simple "terminal", or the like. The electronic device 100 may communicate with a server 200 over a network 10. The network 10 may correspond to a wireless network such as a cellular network or Wi-Fi. The server 200 may correspond to at least one server operated by a mobile network operator which provides a profile to be installed in the eUICC 130. However, when the electronic device 100 uses a general communication function (e.g., the Internet), the server 200 may be understood as being a server which provides the corresponding function, a webpage, or the like.

The electronic device 100 may include at least one processor. For example, the electronic device 100 may include the AP 110 and the CP 120. The AP 110 and the CP 120 may be electrically connected with each other. In an embodiment, the AP 110 and the CP 120 may be implemented as one integrated chip, for example, a system on chip (SOC) or the like. The AP 110 and/or the CP 120 may implement a software module for implementing an operation method of the electronic device 100 according to an embodiment. For example, the AP 110 and the CP 120 may implement a local profile assistant (LPA) 140. Furthermore, the CP 120 may implement a SIM manager 121 for controlling a function associated with the eUICC 130. That is, at least one processor may implement a management module for storing a profile in the eUICC 130 and managing the stored profile.

The electronic device 100 may include the eUICC 130. The eUICC 130 may correspond to a SIM soldered to be incapable of being separated from the electronic device 100. The eUICC 130 may be understood as an eSIM, an embedded secure element (eSE), or the like. The eUICC 130 may be electrically connected with the CP 120.

The eUICC 130 may include a controller and a storage. One or more profiles may be installed in the storage of the eUICC 130. For example, a profile of a first mobile network operator, a profile of a second mobile network operator, a profile of a third mobile network operator, or the like may be installed in the eUICC 130. The controller of the eUICC 130 may control the eUICC 130 such that the CP 120 (or the SIM manager 121) accesses a profile enabled among a plurality of profiles. For example, the eUICC 130 may include an eUICC operating system (OS), an issuer security domain root (ISD-R), and an ISD-profile (ISD-P). The ISD-R may generate a new ISD-P and may manage lifecycles of all ISD-Ps. The ISD-P may be a kind of secure container and may be used to download and install a profile. In other words, a profile package downloaded from the server 200 may be storage/installed in an ISD-P domain.

The electronic device 100 may include the memory 150. Instructions and data may be stored in the memory 150. For example, instructions (e.g., a program code) for at least one processor to implement a software module may be stored in the memory 150. Furthermore, a profile list database 151 may be stored in the memory 150. For example, the LPA 140 may obtain a list of installed profiles, and a state (e.g., enabled/disabled) of each profile, and usage information (e.g., an amount of remaining voice call, an amount of remaining data, a tariff, or the like) of each profile from the eUICC 130 and may store the profile list database 151 including the obtained information in the memory 150.

The electronic device 100 may include at least one communication circuit for performing a communication function. For example, the GPS circuit 170 for ascertaining a location of the electronic device 100 may be included in the electronic device 100. The communication circuit may be electrically connected with the AP 110 or the CP 120. For example, the GPS circuit 170 may be directly connected with the AP 110. The electronic device 100 may include the RF circuit 160. The RF circuit 160 may be directly connected with the CP 120. The RF circuit 160 may refer to a typical cellular RF block for communicating with a cellular network based on a profile stored in the eUICC 130 in the present disclosure, but may include a Wi-Fi RF block for communicating with a Wi-Fi network based on a profile stored in the eUICC 130 and/or an RF block for supporting various communication modes (e.g., Bluetooth, Bluetooth low energy (BLE), near field communication (NFC), magnetic stripe transmission (MST), a wireless charging circuit, or the like) supported by the electronic device 100. The RF block may be understood as the concept of including an antenna radiator, a filter, a switch, an amplifier, such as a low noise amplifier (LNA) or a power amplifier, or the like.

In FIG. 1, the components implemented with hardware may be represented by solid lines, and the components implemented or capable of being implemented with software may be represented by dotted lines. For example, the LPA 140, the SIM manager 121, or the profile list database 151 may be implemented with software. Instructions for implementing software may be stored in the memory 150 or may be hard-coded in the processor (e.g., the AP 110 or the CP 120). That is, in the present disclosure, an operation described as being performed by a software module may be understood as being performed by a processor which operates the corresponding software module.

Furthermore, the components connected by arrows in FIG. 1 may exchange data or instructions with each other. However, a connection relationship of FIG. 1 may be an example for convenience of description, and there may be a connection natural to the level of those skilled in the art between components which are not connected by arrows. For example, it is obvious that the AP 110 may directly access the memory 150.

The LPA 140 may include a local profile download (LPD) 141 and a local user interface (LUI) 142. The LPD 141 and the LUI 142 may be understood as sub-software modules included in the LPA 140. In addition, the LPA 140 may further include an additional software module, but a description will be given of only the LPD 141 and the LUI 142 to prevent the scope and spirit of the prevent disclosure from being blurred.

The LPD 141 may perform a function of downloading a profile from the server 200. For example, for the electronic device 100 to access a cellular network provided from a mobile network operator, a profile corresponding to the mobile network operator should be installed in the eUICC 130. The LPD 141 may download a profile package from the server 200 in over the air (OTA) and may provide the profile package to the eUICC 130 through an interface between the LPD 141 and the eUICC 130.

The LUI 142 may perform a function of providing a UI for managing a profile installed in the eUICC 130 by a user (e.g., an end-user) and delivering an input, provided from the user through the UI, to the eUICC 130. A user input obtained through a touch display of the electronic device 100 or the like may be processed by the AP 110 and may be delivered to the LUI 142 through an interface between the AP 110 and the LUI 142. The LUI 142 may deliver a user input associated with managing a profile (e.g., downloading the profile, enabling the profile, disabling the profile, deleting the profile, a list of profiles, adding the profile, adding/updating a profile nickname, or the like) to the eUICC 130 through an interface between the LUI 142 and the eUICC 130. In an embodiment, instructions/messages delivered from the LPA 140 to the eUICC 130 may be processed by the SIM manager 121 or may bypass the SIM manager 121.

In an embodiment, the SIM manager 121 and the LPA 140 may be implemented with one software module or separate software modules. For example, as shown in FIG. 1, when the SIM manager 121 is separated from the LPA 140, instructions associated with managing a profile delivered from the LPA 140 may be delivered to the eUICC 130 via the SIM manager 121. In the present disclosure, a description will be given on the basis of that the LPA 140 corresponds to a management module for managing a profile of the eUICC 130.

Figure 2:
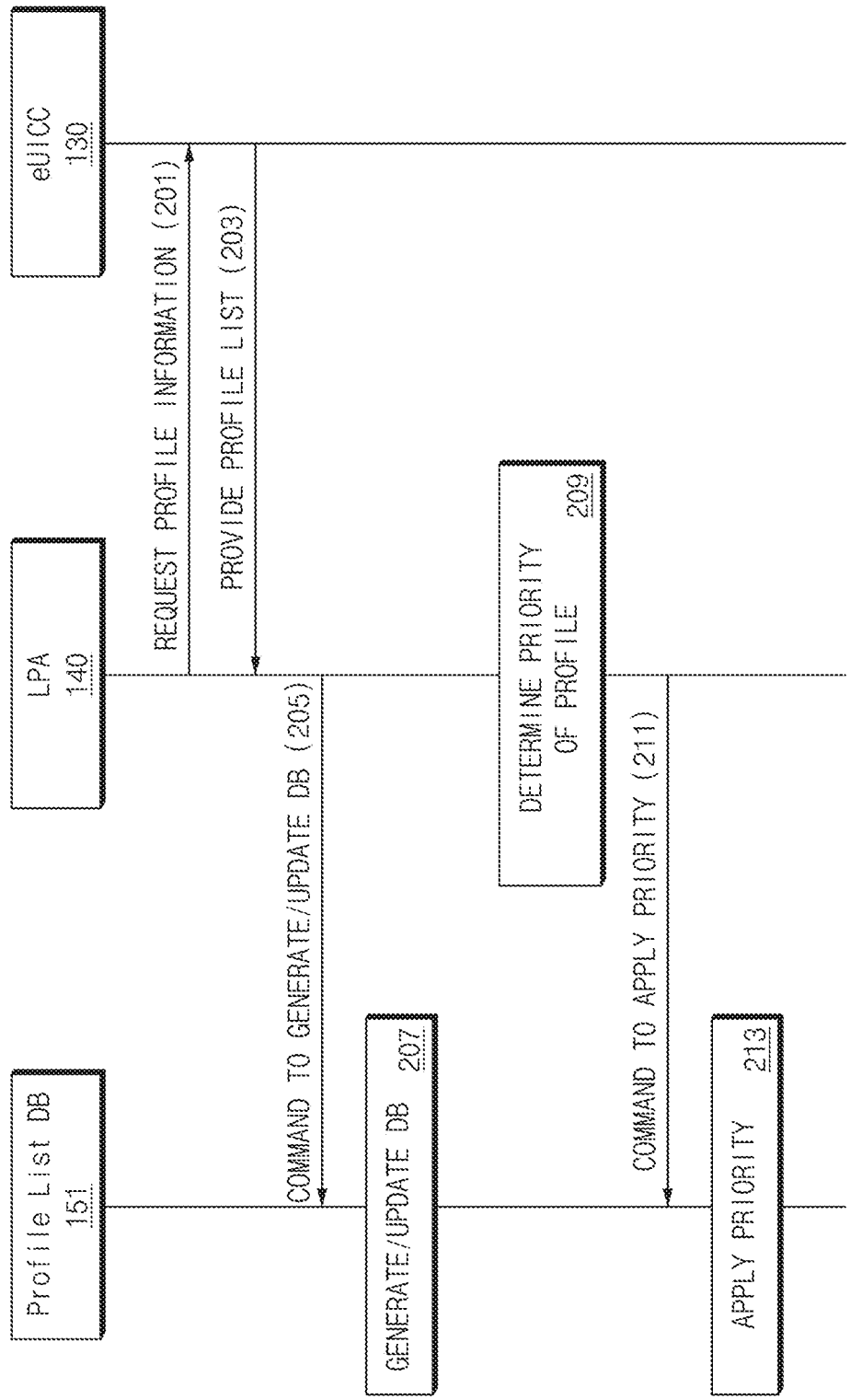
FIG. 2 illustrates a method for managing a profile list database according to an embodiment.

FIG. 2 illustrates a method for managing a profile list database according to an embodiment.

Referring to FIG. 2, in operation 201, an LPA 140 may request profile information from an eUICC 130. For example, the LPA 140 may transmit a "List Profile" command to the eUICC 130. In operation 203, the eUICC 130 may transmit a list of profiles installed in the eUICC 130 and information about a current state (e.g., enabled or disabled) of each profile to the LPA 140 in response to the request of the information.

Operation 201 may be performed in various cases. For example, when a profile is installed or deleted from the eUICC 130, when the profile is enabled or disabled, when an electronic device 100 switches from a power-off state to a power-on state, when an airplane mode is released, when the electronic device 100 departs from a shadow area, when the electronic device 100 departs from an out of service (OOS) state, or when a user input for verifying the eUICC 130 occurs through, for example, an LUI 142, the electronic device 100 may perform operation 201 to verify a profile installed in the eUICC 130.

In operation 205, the LPA 140 may generate or update a profile list database 151. For example, when there is no the profile list database 151 in a memory 150, the LPA 140 may generate the profile list database 151 based on information about profiles obtained from the eUICC 130. When there is no the profile list database 151 may correspond to, for example, when the electronic device 100 is initially used by a user after being manufactured or when a network function is initially enabled after a factory reset. In addition, when only the profile list database 151 is initialized through a user interface or the like or when settings associated with the eUICC 130 are initialized, there is no the profile list database 151.

When the profile list database 150 already exists in the memory 150, the LPA 140 may update the profile list database 151 based on information obtained from the eUICC 130. For example, the LPA 140 may add information about a profile newly purchased by the user to the profile list database 151, may delete information about a deleted profile from the profile list database 151, or may update information about an enabled/disabled state of a profile.

In operation 207, the generation or update of the profile list database 151 may be completed. In an embodiment, the profile list database 151 may transmit information about a time when the generation or update is completed to the LPA 140.

Operations 209 to 213 may be selectively performed. For example, an LUI 142 of the LPA 140 may provide a list of a plurality of profiles installed in the eUICC 130 on a display of the electronic device 100. For example, a profile setting UI or the like may be provided to a user. In operation 209, the LPA 140 may set a priority of a profile by means of a user input through the UI. Alternatively, the LPA 140 may automatically set a priority of a profile based on the frequency that the user uses a profile, a time when the user uses the profile, the number of times the user updates the profile, or the like. Herein, the frequency that the user uses the profile may correspond to the number of times the profile is enabled. The time when the user uses the profile may correspond to a time when an enable state is maintained. The number of times the user updates the profile may correspond to the number of times the user extends an expiration period of the profile before the purchased profile expires or additionally purchases an amount of available call/data.

In operation 211, the LPA 140 may transmit a command to apply the set priority to the profile list database 151 to the profile list database 151. In operation 213, the profile list database 151 may apply the priority to a profile included in the profile list database 151. Herein, the priority may be understood as a user preference.

Figure 3:
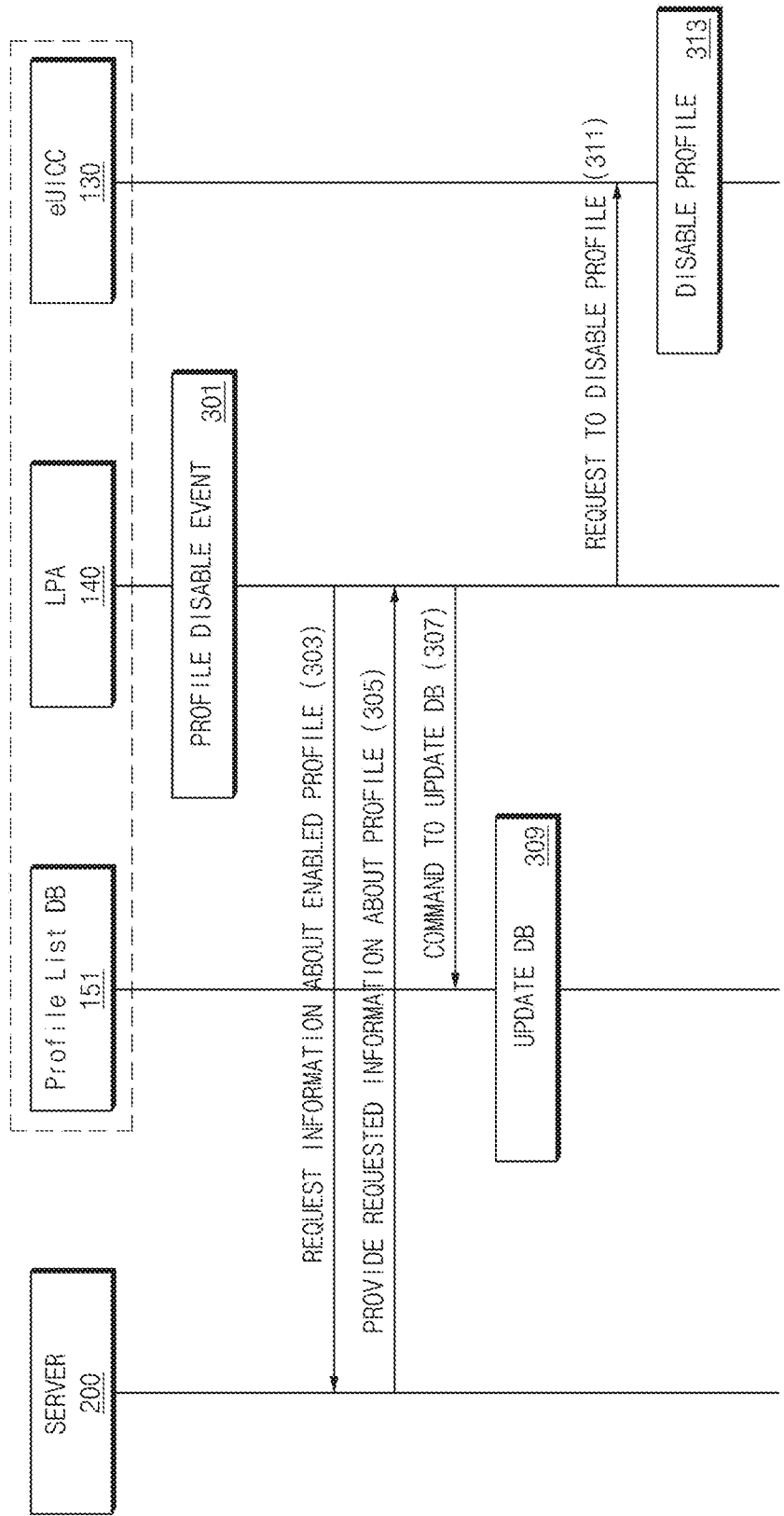
FIG. 3 illustrates a method for updating a profile database according to an embodiment.

FIG. 3 illustrates a method for updating a profile database according to an embodiment.

In operation 301, a profile disable event may occur. For example, a user may disable a specific profile through a user interface provided through an LUI 142 of an LPA 140. In an embodiment, although the event of disabling the profile occurs, after a series of operations shown in FIG. 3 are performed, the profile may be finally disabled.

In operation 303, the LPA 140 (or an electronic device 100) may request information about an enabled profile from a server 200. Herein, the enabled profile may refer to a profile corresponding to the disabled event (the profile should be currently in an enable state to disable the profile). Furthermore, the server 200 may correspond to, for example, a mobile network operator (MNO) server, a mobile virtual network operator (MVNO) server, a profile management server, or the like.

In operation 305, the server 200 may provide the requested information about the profile in response to the request. In other words, in operation 305, the LPA 140 (or the electronic device 100) may receive the information about the profile from the server 200. The information about the profile may include, for example, a total amount of voice call, total data capacity, an amount of available call, available data capacity, an amount of remaining call, or remaining data capacity, which is assigned to the profile, and an expiration period of the profile, whether the profile is automatically updated, whether the profile supports 2G/3G/long-term evolution (LTE), whether the profile supports carrier aggregation (CA), a coverage of an operator corresponding to the profile, or the like.

In operation 307, the LPA 140 may transmit a command to update a profile list database 151 to the profile list database 151 based on the obtained information of the profile. In operation 309, the profile list database 151 may be updated. In other words, the information of the corresponding profile may be stored and/or updated.

In operation 311, the LPA 140 may transmit a request to disable the profile in which the disable event occurs to an eUICC 130. However, in another embodiment, the disable request, that is, operation 311 may be performed at a time when operation 301 occurs. In other words, operations 311 and 313 are unnecessary to be subsequent to operations 303 to 309 and may be performed independently of operations 303 to 309.

When receiving the disable request, in operation 313, the eUICC 130 may disable the profile corresponding to the request. After disabling the profile, the eUICC 130 may perform a refresh operation. In addition, the eUICC 130 may automatically enable another profile specified by a user or any another profile.

In an embodiment, processes 303 to 309 of FIG. 3 may be performed by occurrence of pre-defined another event rather than the profile disable event 301. For example, when it is a specified time (e.g., 00 hour) every day, the electronic device 100 may perform the task of obtaining information about an enabled profile from the server 200 and updating the profile list database 151. For another example, when the electronic device 200 is in a charging state or when an event of compulsorily updating the profile list database 151 occurs, the electronic device 100 may perform operation 303 to 309. Additionally or alternatively, when a network is in an OOS state temporarily or when a network state is poor (e.g., degradation of receive sensitivity), the electronic device may perform operations 303 to 309.

Figure 4:
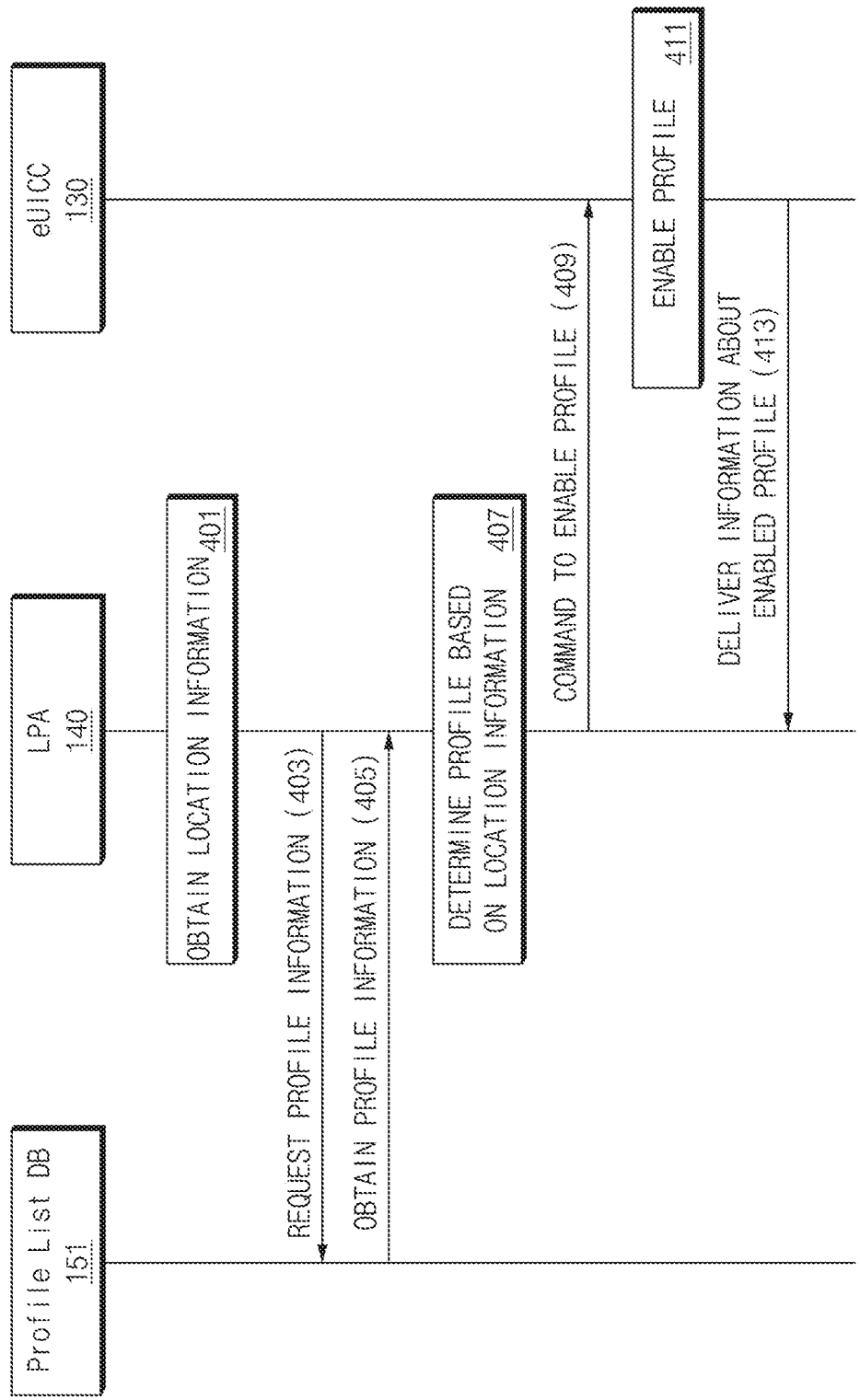
FIG. 4 illustrates a method for changing a profile based on location information according to an embodiment.

FIG. 4 illustrates a method for changing a profile based on location information according to an embodiment.

Referring to FIG. 4, in operation 401, an LPA 140 may obtain current location information of an electronic device 100. For example, the electronic device 100 may obtain a coordinate value of a point where the electronic device 100 is currently located, using a GPS circuit 170. An AP 100 may provide country information corresponding to the coordinate value to the LPA 140. Additionally or alternatively, the electronic device 100 may perform network searching using an RF circuit 160 and may obtain public land mobile network (PLMN) information. The electronic device 100 (e.g., a CP 120) may obtain information about a country where the electronic device 100 is currently located and an available mobile network operator from mobile country code (MCC) and mobile network code (MMC) information included in the found PLMN. Hereinafter, for convenience of description, it is assumed that a first profile among a plurality of profiles included in the eUICC 130 is enabled.

In operation 403, the LPA 140 may request profile information from a profile list database 151 based on the obtained location information. For example, when the obtained location information is the USA, the LPA 140 may query the profile list database 151 for a profile available in the USA. In addition, when the obtained location information is the USA and when available operator information is AT&T, the LPA 140 may query a network provided from the AT&T for an available profile among profiles available in the USA.

In operation 405, the LPA 140 may obtain profile information based on the location information. The profile based on the location information may be one profile and two or more profiles.

In operation 407, the LPA 140 may determine a profile to be enabled based on the location information. For example, the LPA 140 may determine to enable a second profile. When information about a plurality of profiles is obtained in operation 405, the LPA 140 may perform additional operations for determining a profile to be enabled among the plurality of obtained profiles. In this regard, a description will be given below with reference to FIGS. 5 and 6.

In operation 409, the LPA 140 may transmit a command to enable the determined profile, that is, the second profile, to the eUICC 130. In operation 411, the eUICC 130 may enable the second profile in response to the enable command. For example, the eUICC 130 may disable the first profile and may enable the second profile. A refresh operation may be performed together with the disable/enable operation.

In operation 413, the eUICC 130 may provide information about the enabled second profile to the LPA 140 (e.g., in this case, the CP 120). The LPA 140 may provide information about the second profile to a hardware/software module associated with the second profile. Furthermore, the CP 120 may perform registration with a network 10 using the enabled second profile.

Referring to the process of FIG. 4, the electronic device 100 may determine a profile through the LPA 140 implemented by the AP 110 and/or the CP 120 and may provide only a command to enable the determined profile to the eUICC 130. Since processors loaded into the electronic device 100 are relatively better in calculation capability than a controller which performs an arithmetic operation, the electronic device 10 may considerably shorten a time taken to determine and enable a profile.

Figure 5:
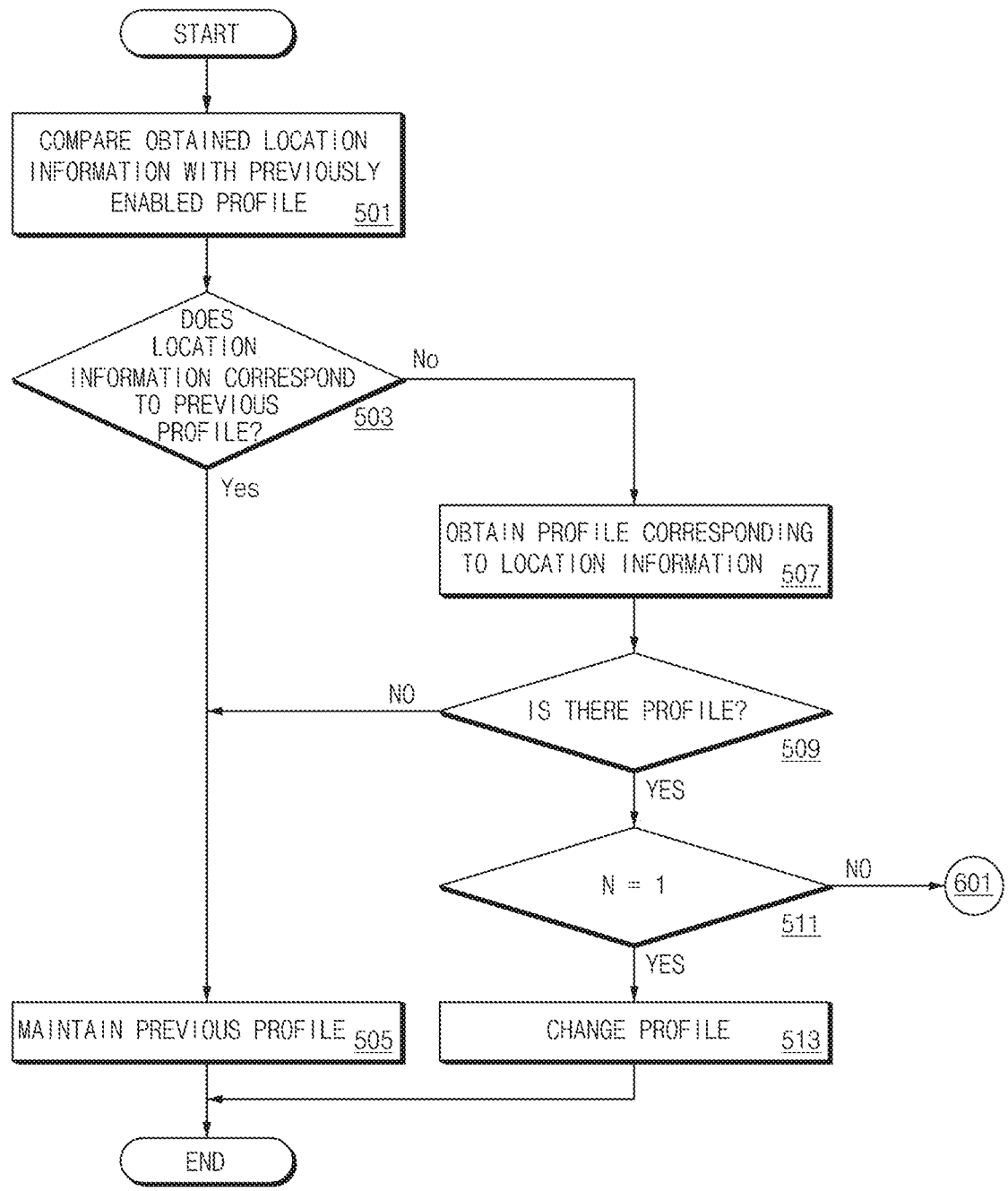
FIG. 5 illustrates a scenario of maintaining and changing a profile according to an embodiment.

FIG. 5 illustrates a scenario of maintaining and changing a profile according to an embodiment.

In an embodiment of FIG. 5, similar to an embodiment of FIG. 4, a description will be given of an example of maintain a first profile or changing to a second profile, in a state where the first profile is enabled. Thus, no description of details similar, the same, or corresponding to details described in FIG. 4 will be provided.

In operation 501, an electronic device 100 may compare obtained location information with a previously enabled profile. For example, when an airplane mode of the electronic device 100 is released, when the electronic device 100 is powered on, or when the electronic device 100 departs from an OOS state, the electronic device 100 may obtain location information via a GPS circuit 170 or an RF circuit 160. The electronic device 100 may compare the location information with information of the previously enabled profile, that is, a first profile.

In operation 503, the electronic device 100 may determine whether the location information corresponds to the previous profile. For example, when a current location corresponds to PLMN information of the first profile, in operation 505, the electronic device 100 may maintain the first profile. When the newly obtained location information does not correspond to the previous profile, in operation 507, the electronic device 100 may obtain a profile corresponding to the location information from a profile list database 151. Operation 507 may correspond to operations 403 and 405 in FIG. 4.

In operation 509, the electronic device 100 may determine whether there is a profile corresponding to the current location information in the profile list database 151. When there is no the profile corresponding to the current location information in the profile list database 151, the electronic device 100 may continue maintaining the first profile without changing the profile. In this case, the electronic device 100 may use a roaming service of a network of an operator who has a roaming agreement with the operator of the first profile, using the first profile.

When there is the profile corresponding to the current location information in the profile list database 151, in operation 511, the electronic device 100 may determine whether the profile is the only profile (N=1) corresponding to the current location information. For example, when the profile corresponding to the current location information is only one second profile, in operation 513, the electronic device 100 may change the enabled profile from the first profile to the second profile.

When there are two or more profiles corresponding to the current location information, for example, when one or more profiles except for the second profile correspond to the current location information, the electronic device 100 may select a suitable profile using additional information in operation 601. A description will be given with reference to FIG. 6.

Figure 6:
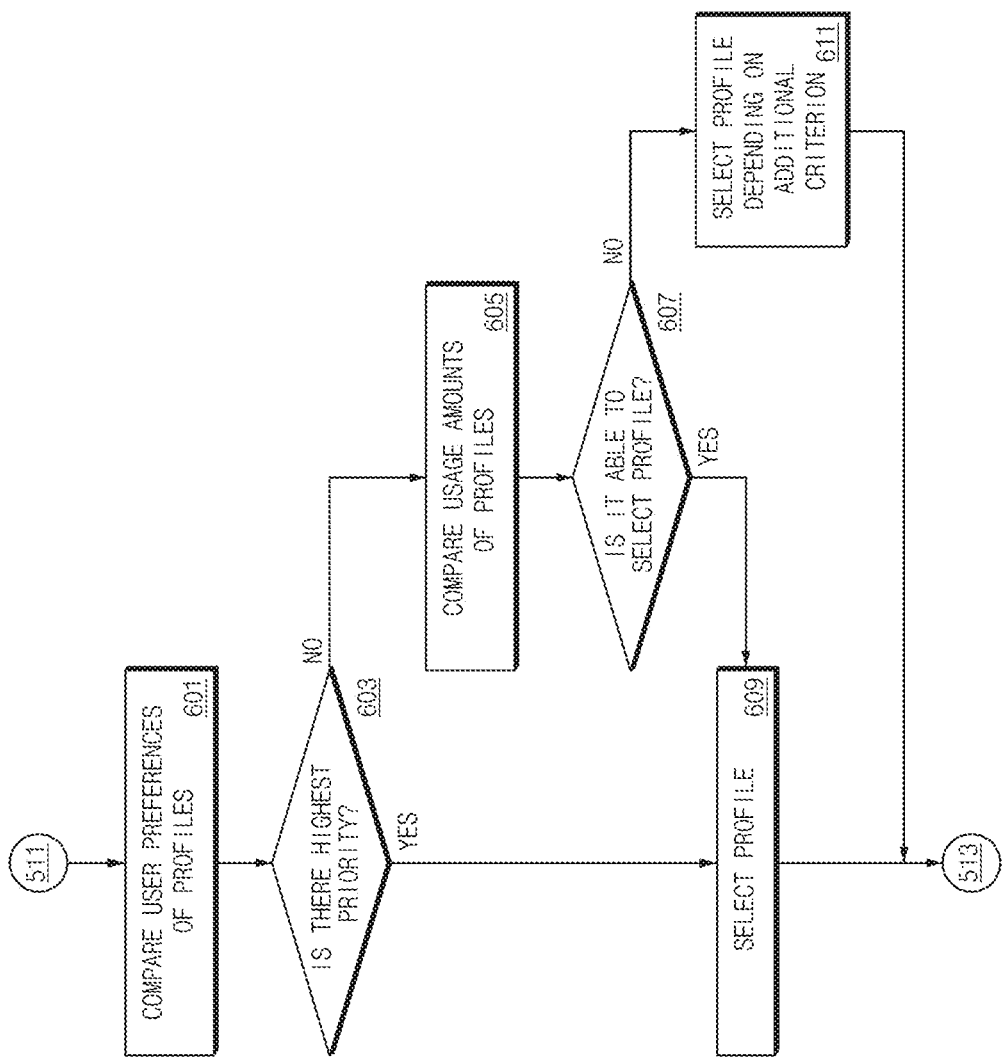
FIG. 6 illustrates a scenario of selecting a profile according to an embodiment.

FIG. 6 illustrates a scenario of selecting a profile according to an embodiment. A process of FIG. 6 may be performed subsequent to, for example, operation 511 of FIG. 5.

In operation 601, an electronic device 100 may compare user preferences of a plurality of profiles corresponding to location information. A user preference for each profile may have, for example, a value set by operations 209 to 213 of FIG. 2.

In operation 603, the electronic device 100 may determine whether there is a profile having the highest preference, for example, the highest priority among the plurality of profiles. In operation 609, the electronic device 100 may select a profile having the highest priority. For convenience of description, it is assumed that a second profile is selected. When the profile having the highest priority is selected, in operation 513 of FIG. 5, the electronic device 100 may change an enabled profile to the selected profile.

When there is no the profile having the highest priority, for example, when user preferences are not set in the profiles, in operation 605, the electronic device 100 may compare usage amounts of the profiles. For example, the second profile may remain 5 hours/5 GB in voice/data usage, a third profile may remain 2 hours/3 GB in voice/data usage, and a fourth profile may remain 10 GB in only data usage.

In operation 607, the electronic device 100 may determine whether it is able to select any one of the plurality of profiles. For example, when configured to select a profile prior to data usage, the electronic device 100 may select the fourth profile. When configured to select a profile prior to an amount of voice call, the electronic device 100 may select the second profile. In addition, there may be a method for applying a weight to a voice, a text, data usage, or the like and selecting a profile having the highest score as a result of applying the weight.

When it is unable to select any one of the plurality of profiles, for example, when the profiles have an equal condition (e.g., when the profiles are the same as each other in remaining amount of data/voice call), or when a criterion of selecting a profile is not predefined, in operation 611, the electronic device 100 may select a profile depending on additional settings. The electronic device 100 may select the profile based on information different from information described above among information of profiles which may be verified from a profile list database 151, for example, an expiration period of the profile, whether it is able to access an LTE network using the profile, or the like. In an embodiment, the electronic device 100 may provide the plurality of profiles through a UI and may determine a profile selected based on a user input as a profile to be enabled. For example, the electronic device 100 may provide information about remaining usage for the plurality of profiles, an operator name, or the like on its display.

FIG. 6 illustrates a method for sequentially applying user preferences, usage amounts of profiles, and other criteria and selecting a profile when there are the plurality of profiles corresponding to the location information. Herein, the embodiment of the FIG. 6 is an exemplary example indicating that various criteria for selecting a profile may be sequentially applied and ranges in criteria for selection and order where the criteria are applied. Furthermore, information used to select a profile in FIG. 6 may be obtained from the profile list database 151 through, for example, operations 403 and 405 of FIG. 4.

Operations described as being performed by the electronic device 100 in FIGS. 5 and 6 may be understood as being performed by a management module implemented with at least one processor, for example, an LPA 140. When the profile is selected by the process of FIGS. 5 and/or 6, the management module may transmit a command to enable the selected profile to an eUICC 130. The controller of the eUICC 130 may enable/refresh the selected profile using, for example, an ISD-R.

A method for enabling a profile in an electronic device according to various embodiments may include obtaining location information of the electronic device, when the location information does not correspond to a first profile which is enabled in an eUICC of the electronic device, obtaining information about at least one profile corresponding to the location information from a memory of the electronic device, the memory being independent of the eUICC, and disabling the first profile and enabling a second profile among the at least one profile.

In an embodiment, the enabling of the second profile may include selecting the second profile based on the information about the at least one profile obtained from the memory. The information about the at least one profile may include at least one of a priority for each profile or information about voice or data usage.

Figure 7:
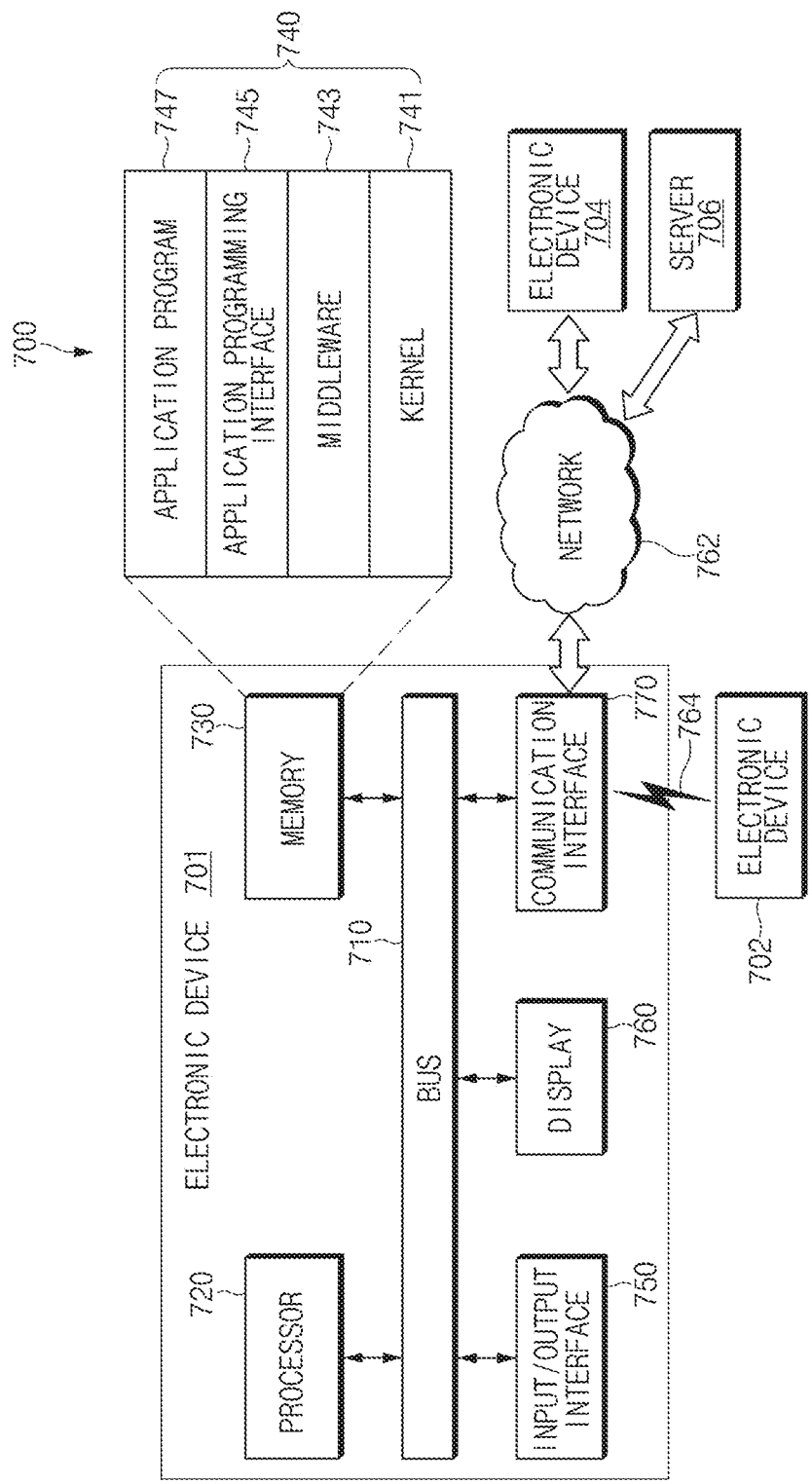
FIG. 7 is a block diagram of an electronic device in a network environment according to an embodiment.

FIG. 7 is a block diagram of an electronic device in a network environment according to an embodiment of the present disclosure.

Referring to FIG. 7, the electronic device 701 in the network environment 700 according to an embodiment of the present disclosure is described below. The electronic device 701 may include a bus 710, a processor 720, a memory 730, an input/output interface 750, a display 760, and a communication interface 770. At least one of the foregoing elements 710 to 770 may be omitted or another element may be added to the electronic device 701.

The bus 710 may include a circuit for connecting the above-mentioned elements 710 to 770 to each other and transferring communications (e.g., control messages and/or data) among the above-mentioned elements 710 to 770.

The processor 720 may include at least one of a CPU, an AP, and a communication processor (CP). The processor 720 may perform data processing, an operation related to communication, and/or control of at least one of the other elements of the electronic device 701.

The memory 730 may include a volatile memory and/or a nonvolatile memory. The memory 730 may store instructions or data related to at least one of the other elements of the electronic device 701. According to an embodiment of the present disclosure, the memory 730 may store software and/or a program 740. The program 740 may include, for example, a kernel 741, middleware 743, an application programming interface (API) 745, and/or an application program (or an application) 747. At least a portion of the kernel 741, the middleware 743, or the API 745 may be referred to as an operating system (OS).

The kernel 741 may control or manage system resources (e.g., the bus 710, the processor 720, the memory 730, and the like) used to perform operations or functions of other programs (e.g., the middleware 743, the API 745, or the application program 747). Furthermore, the kernel 741 may provide an interface for allowing the middleware 743, the API 745, and the application program 747 to access individual elements of the electronic device 701 in order to control or manage the system resources.

The middleware 743 may serve as an intermediary so that the API 745 or the application program 747 may communicate and exchange data with the kernel 741.

Furthermore, the middleware 743 may handle one or more task requests received from the application program 747 according to a priority order. For example, the middleware 743 may assign at least one application program 747 a priority for using the system resources (e.g., the bus 710, the processor 720, the memory 730, and the like) of the electronic device 701. For example, the middleware 743 may handle one or more task requests according to a priority assigned to at least one application, thereby performing scheduling or load balancing with respect to the one or more task requests.

The API 745, which is an interface for allowing the application program 747 to control a function provided by the kernel 741 or the middleware 743, may include, for example, at least one interface or function (e.g., instructions) for file control, window control, image processing, character control, and the like.

The input/output interface 750 may serve to transfer an instruction or data input from a user or another external device to (an)other element(s) of the electronic device 701.

Furthermore, the input/output interface 750 may output instructions or data received from (an)other element(s) of the electronic device 701 to the user or another external device.

The display 760 may include, for example, a liquid crystal display (LCD), a light-emitting diode (LED) display, an organic light-emitting diode (OLED) display, a microelectromechanical systems (MEMS) display, or an electronic paper display. The display 760 may present various content (e.g., a text, an image, a video, an icon, a symbol, or the like) to a user. The display 760 may include a touch screen, and may receive a touch, a gesture, a proximity or hovering input from an electronic pen or a part of a body of a user.

The communication interface 770 may establish communication between the electronic device 701 and an external device (e.g., a first external electronic device 702, a second external electronic device 704, or a server 706). For example, the communication interface 770 may be connected to a network 762 via wireless communications or wired communications so as to communicate with the second external electronic device 704 or the server 706.

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM). The wireless communications may include, for example, short-range communications 764. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 701 may transmit the electromagnetic signals to a reader device such as a POS device. The POS device may detect the magnetic signals by using an MST reader and restore data by converting the detected electromagnetic signals into electrical signals.

The GNSS may include, for example, at least one of a global positioning system (GPS), a global navigation satellite system (GLONASS), a BeiDou navigation satellite system (BeiDou), or Galileo, the European global satellite-based navigation system according to a use area or a bandwidth. Hereinafter, the terms "GPS" and "GNSS" may be used interchangeably. The wired communications may include at least one of a universal serial bus (USB), a high definition multimedia interface (HDMI), a recommended standard 232 (RS-232), a plain old telephone service (POTS), and the like. The network 762 may include at least one of telecommunications networks, for example, a computer network (e.g., a local area network (LAN) or a wide area network (WAN)), the Internet, or a telephone network.

The types of the first external electronic device 702 and the second external electronic device 704 may be the same as or different from the type of the electronic device 701. According to an embodiment of the present disclosure, the server 706 may include a group of one or more servers. A portion or all of the operations performed in the electronic device 701 may be performed in the first electronic device 702, the second external electronic device 704, or the server 706. When the electronic device 701 is to perform a certain function or service automatically or in response to a request, the electronic device 701 may request at least a portion of functions related to the function or service from the first electronic device 702, the second external electronic device 704, or the server 706 instead of, or in addition to, performing the function or service itself. The first electronic device 702, the second external electronic device 704, or the server 706 may perform the requested function or an additional function, and may transfer a result of performing a function to the electronic device 701. The electronic device 701 may use a received result as is or additionally process the received result to provide the requested function or service. To this end, for example, a cloud computing technology, a distributed computing technology, or a client-server computing technology may be used.

Figure 8:
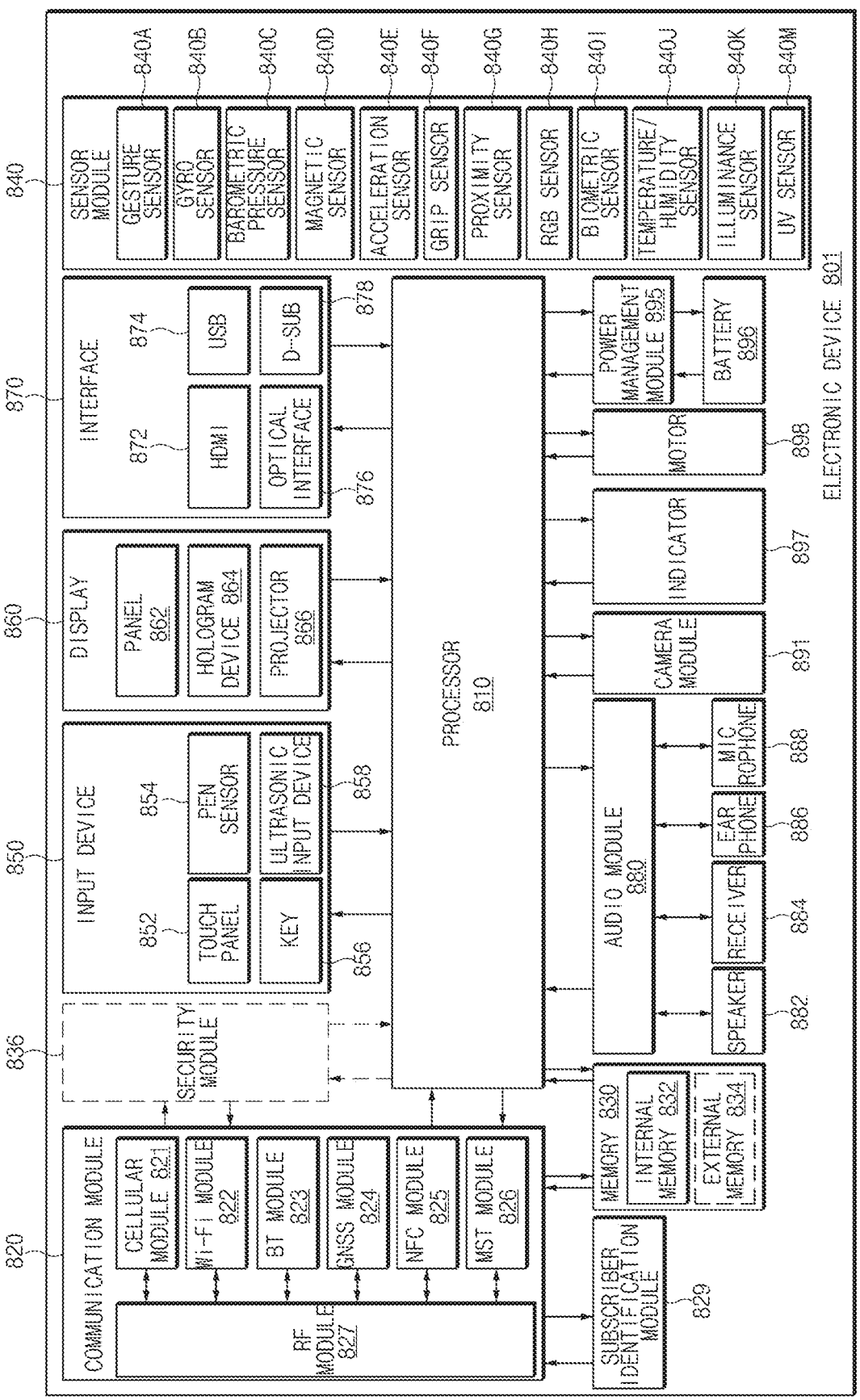
FIG. 8 is a block diagram of an electronic device according to an embodiment.

FIG. 8 is a block diagram of an electronic device 801 according to an embodiment of the present disclosure.

Referring to FIG. 8, the electronic device 801 may include, for example, a part or an entirety of the electronic device 701 illustrated in FIG. 7. The electronic device 801 may include at least one processor (e.g., AP) 810, a communication module 820, a subscriber identification module (SIM) 824, a memory 830, a sensor module 840, an input device 850, a display 860, an interface 870, an audio module 880, a camera module 891, a power management module 895, a battery 896, an indicator 897, and a motor 898.

The processor 810 may run an OS or an application program so as to control a plurality of hardware or software elements connected to the processor 810, and may process various data and perform operations. The processor 810 may be implemented with, for example, a system on chip (SoC). According to an embodiment of the present disclosure, the processor 810 may further include a graphics processing unit (GPU) and/or an image signal processor (ISP). The processor 810 may include at least a portion (e.g., a cellular module 821) of the elements illustrated in FIG. 8. The processor 810 may load, on a volatile memory, an instruction or data received from at least one of the other elements (e.g., a nonvolatile memory) to process the instruction or data, and may store various data in a nonvolatile memory.

The communication module 820 may have a configuration that is the same as or similar to that of the communication interface 770 of FIG. 7. The communication module 820 may include, for example, the cellular module 821, a Wi-Fi module 822, a Bluetooth (BT) module 823, a GNSS module 824 (e.g., a GPS module, a GLONASS module, a BeiDou module, or a Galileo module), an NFC module 825, and a radio frequency (RF) module 827.

The cellular module 821 may provide, for example, a voice call service, a video call service, a text message service, or an Internet service through a communication network. The cellular module 821 may identify and authenticate the electronic device 801 in the communication network using the SIM 829 (e.g., a SIM card). The cellular module 821 may perform at least a part of the functions that may be provided by the processor 810. The cellular module 821 may include a CP.

Each of the WiFi module 822, the Bluetooth module 823, the GNSS module 824, the NFC module 825, and the MST module 826 may include, for example, a processor for processing data transmitted/received through the modules. According to an embodiment of the present disclosure, at least a part (e.g., two or more) of the cellular module 821, the WiFi module 822, the Bluetooth module 823, the GNSS module 824, the NFC module 825, and the MST module 826 may be included in a single integrated circuit (IC) or IC package.

The RF module 827 may transmit/receive, for example, communication signals (e.g., RF signals). The RF module 827 may include, for example, a transceiver, a power amplifier module (PAM), a frequency filter, a low noise amplifier (LNA), an antenna, or the like. According to an embodiment of the present disclosure, at least one of the cellular module 821, the WiFi module 822, the Bluetooth module 823, the GNSS module 824, the NFC module 825, or the MST module 826 may transmit/receive RF signals through a separate RF module.

The SIM 829 may include, for example, an embedded SIM and/or a card containing the SIM, and may include unique identification information (e.g., an integrated circuit card identifier (ICCID)) or subscriber information (e.g., an international mobile subscriber identity (IMSI)).

The memory 830 (e.g., the memory 760 of FIG. 7) may include, for example, an internal memory 832 or an external memory 834. The internal memory 832 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 834 may include a flash drive such as a compact flash (CF) drive, a secure digital (SD) memory card, a micro-SD memory card, a mini-SD memory card, an extreme digital (xD) memory card, a multimedia card (MMC), a memory stick, or the like. The external memory 834 may be operatively and/or physically connected to the electronic device 801 through various interfaces.

A security module 836, which is a module including a storage space that is more secure (e.g. has a higher security level) than the memory 830, may be a circuit for providing secure data storage and protected execution circumstances. The security module 836 may be implemented with an additional circuit and may include an additional processor. The security module 836 may be present in an attachable smart chip or SD card, or may include an embedded secure element (eSE), which is installed in a fixed chip. Additionally, the security module 836 may be driven in another OS which is different from the OS of the electronic device 801. For example, the security module 836 may operate based on a java card open platform (JCOP) OS.

The sensor module 840 may, for example, measure a physical quantity or detect an operation state of the electronic device 801 so as to convert measured or detected information into an electrical signal. The sensor module 840 may include, for example, at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a red/green/blue (RGB) sensor), a biometric sensor 840I, a temperature/humidity sensor 840J, an illumination sensor 840K, or an ultraviolet (UV) light sensor 840M. Additionally, or alternatively, the sensor module 840 may include, for example, an olfactory sensor (e.g., an electronic nose (E-nose) sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 840 may further include a control circuit for controlling at least one sensor included therein. In an embodiment of the present disclosure, the electronic device 801 may further include a processor configured to control the sensor module 840 as a part of the processor 810 or separately, so that the sensor module 840 is controlled while the processor 810 is in a reduced power, or sleep, state.

The input device 850 may include, for example, a touch panel 852, a (digital) pen sensor 854, a key 856, or an ultrasonic input device 858. The touch panel 852 may employ at least one of a capacitive method, a resistive method, an infrared method, and an ultraviolet light sensing method. The touch panel 852 may further include a control circuit. The touch panel 852 may further include a tactile layer so as to provide a haptic feedback to a user.

The (digital) pen sensor 854 may include, for example, a sheet for recognition which is a part of a touch panel or is separate. The key 856 may include, for example, a physical button, an optical button, or a keypad. The ultrasonic input device 858 may sense ultrasonic waves generated by an input tool through a microphone 888 so as to identify data corresponding to the ultrasonic waves sensed.

The display module 860 (e.g., the display 770 of FIG. 7) may include a panel 862, a hologram device 864, or a projector 866. The panel 862 may be configured the same as or similar to that of the display 770 of FIG. 7. The panel 862 may be, for example, flexible, transparent, or wearable. The panel 862 and the touch panel 852 may be integrated into a single module. The hologram device 864 may display a stereoscopic image in a space using a light interference phenomenon. The projector 866 may project light onto a screen so as to display an image. The screen may be disposed internally or externally to the electronic device 801. According to an embodiment of the present disclosure, the display module 860 may further include a control circuit for controlling the panel 862, the hologram device 864, or the projector 866.

The interface 870 may include, for example, a high definition multimedia interface (HDMI) 872, a universal serial bus (USB) 874, an optical interface 876, or a D-sub-miniature (D-sub) connector 878. The interface 870, for example, may be included in the communication circuit 720 of FIG. 7. Additionally, or alternatively, the interface 870 may include, for example, a mobile high-definition link (MHL) interface, an SD/MMC interface, or an Infrared Data Association (IrDA) interface.

The audio module 880 may convert, for example, sound into an electrical signal or vice versa. At least a portion of the elements of the audio module 880 may be included in the input/output interface 750 illustrated in FIG. 7. The audio module 880 may process sound information input or output through a speaker 882, a receiver 884, an earphone 886, or the microphone 888.

The camera module 891 is, for example, a device for recording a still image or a video. According to an embodiment of the present disclosure, the camera module 891 may include at least one image sensor (e.g., a front sensor or a rear sensor), a lens, an ISP, or a flash (e.g., an LED or a xenon lamp).

The power management module 895 may manage power of the electronic device 801. According to an embodiment of the present disclosure, the power management module 895 may include a power management integrated circuit (PMIC), a charger integrated circuit (IC), or a battery gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 896 and a voltage, current or temperature thereof while the battery 896 is charged. The battery 896 may include, for example, a rechargeable battery and/or a solar battery.

The indicator 897 may display a certain state of the electronic device 801 or a part thereof (e.g., the processor 810), such as a booting state, a message state, a charging state, or the like. The motor 898 may convert an electrical signal into a mechanical vibration, and may generate a vibration or haptic effect. A processing device (e.g., a GPU) for supporting a mobile TV may be included in the electronic device 801. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In an embodiment of the present disclosure, an electronic device may include at least one of the elements described herein, and some elements may be omitted or other additional elements may be added. Furthermore, some of the elements of the electronic device may be combined with other electronic devices to form one entity, so that the functions of the elements may be performed in the same manner as before the combination.

An electronic device according to various embodiments may include at least one processor, an eUICC configured to be electrically connected with the at least one processor and include a plurality of profiles, an RF circuit configured to communicate with a network using a first profile enabled among the plurality of profiles, a GPS circuit, and a memory storing a profile list database including information about the plurality of profiles. The at least one processor may implement a management module for managing the plurality of profiles. The management module may disable the first profile and may enable a second profile among the plurality of profiles, based on location information obtained by the RF circuit or the GPS circuit.

In an embodiment, the management module may request information about a profile installed in the eUICC from the eUICC. The eUICC may provide the information about the plurality of profiles to the management module in response to the request. The management module may store the profile list database in the memory based on the information about the plurality of profiles. Herein, the information about the plurality of profiles may include identification information of each profile, PLMN information of each profile, or state information indicating that each profile is enabled or disabled.

In an embodiment, the profile list database may include at least one of a preference of each of the plurality of profiles, voice call usage, data usage, or information about an expiration time.

In an embodiment, the management module may request information about the first profile from a server, when a disable event of the first profile occurs, may obtain the information about the first profile in response to the request, and may update the profile list database based on the obtained information about the first profile. Herein, the management module may request the eUICC to disable the first profile, and the eUICC may disable the first profile in response to the request.

In an embodiment, the location information may correspond to coordinate information obtained by the GPS circuit, and information about the second profile stored in the profile list database may include a country corresponding to the coordinate information.

In an embodiment, the location information may correspond to PLMN information obtained by the RF circuit, and information about the second profile stored in the profile list database may include the PLMN information.

In an embodiment, the management module may deliver a command to disable the first profile and enable the second profile to the eUICC, and the eUICC may disable the first profile, may enable the second profile, and may deliver information about the enabled second profile to the management module.

In an embodiment, the management module may, when there are two or more profiles corresponding to the location information in the profile list database, enable the second profile which meets a pre-defined criterion. Herein, the management module may enable the second profile having the highest priority among the two or more profiles corresponding to the location information. Alternatively, the management module may enable the second profile having the most voice or data usage among the two or more profiles corresponding to the location information. Alternatively, the management module may enable the second profile, an expiration time of which arrives first, among the two or more profiles corresponding to the location information.

An electronic device according to various embodiments may include an application processor, a GPS circuit configured to be electrically connected with the application processor, a communication processor, an RF circuit configured to be electrically connected with the communication processor, an eUICC configured to be electrically connected with the communication processor and store a plurality of profiles, and a memory storing a profile list database including information about the plurality of profiles. The communication processor may provide a command to enable a profile corresponding to location information among the plurality of profiles to the eUICC based on the location information obtained by the RF circuit or the GPS circuit and the profile list database.

In an embodiment, the eUICC may enable the profile corresponding to the location information, in response to the command. Herein, the eUICC may provide information about the enabled profile to the communication processor.

In an embodiment, the electronic device may further include a display configured to provide a setting UI for the plurality of profiles. The application processor may apply a preference of a profile provided through the setting UI to the profile list database.

In an embodiment, the electronic device may further include a display. The application processor may provide information about remaining usage of the profile corresponding to the location information to the display.

Figure 9:
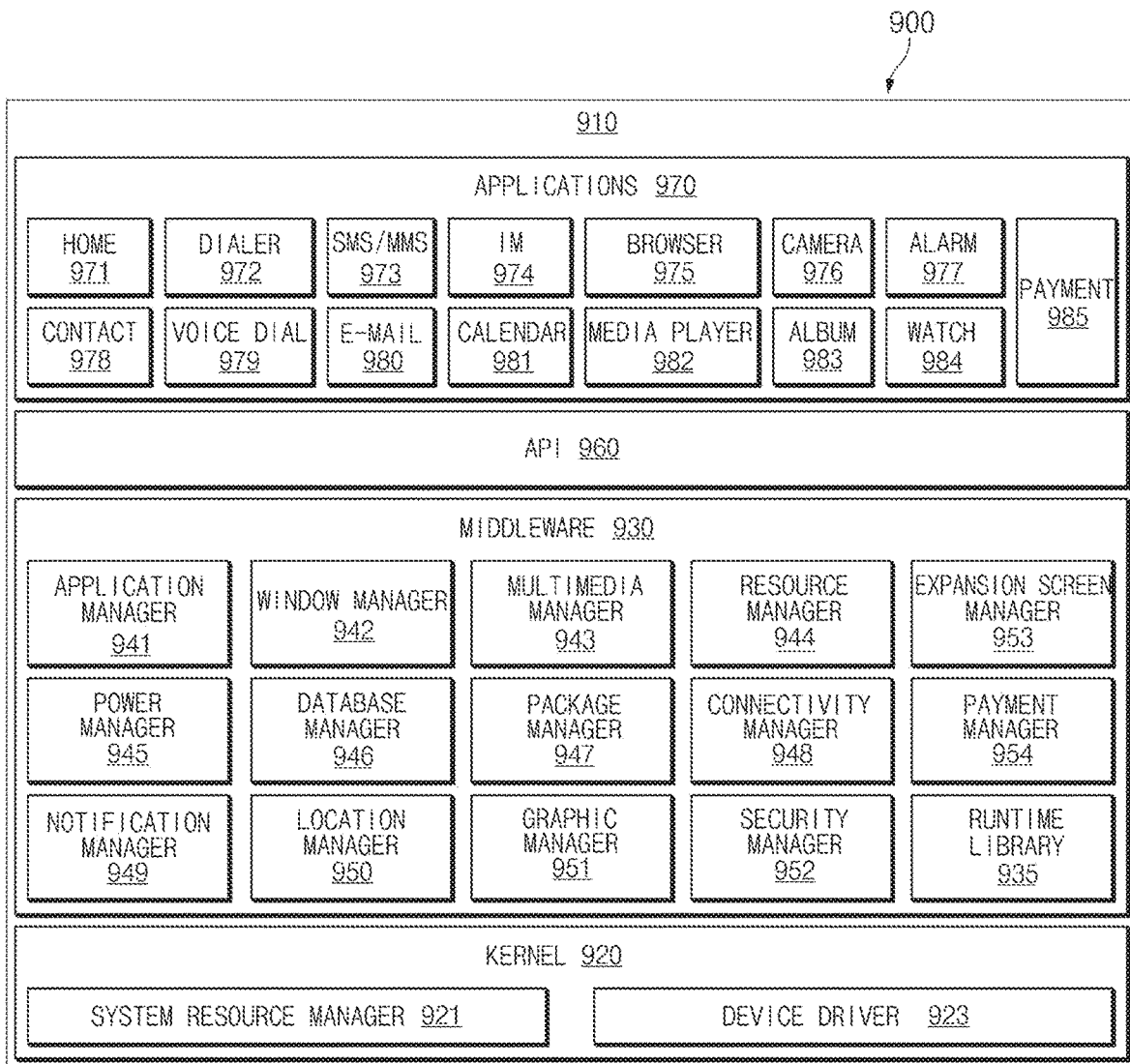
FIG. 9 is a block diagram of a program module according to an embodiment.

FIG. 9 is a block diagram of a program module according to an embodiment of the present disclosure.

Referring to FIG. 9, the program module 910 may include an OS for controlling a resource related to an electronic device and/or various applications running on the OS. The OS may be, for example, Android, iOS, Windows, Symbian, Tizen, or the like.

The program module 910 may include a kernel 920, middleware 930, an API 960, and/or an application 970. At least a part of the program module 910 may be preloaded on an electronic device or may be downloaded from the first electronic device 702, the second external electronic device 704, or the server 706 in FIG. 7.

The kernel 920 may include, for example, a system resource manager 921 or a device driver 923. The system resource manager 921 may perform control, allocation, or retrieval of a system resource. According to an embodiment of the present disclosure, the system resource manager 921 may include a process management unit, a memory management unit, a file system management unit, and the like. The device driver 923 may include, for example, a display driver, a camera driver, a BT driver, a shared memory driver, a USB driver, a keypad driver, a Wi-Fi driver, an audio driver, or an inter-process communication (IPC) driver.

The middleware 930, for example, may provide a function that the applications 970 require in common, or may provide various functions to the applications 970 through the API 960 so that the applications 970 may efficiently use limited system resources in the electronic device. According to an embodiment of the present disclosure, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, and a payment manager 954.

The runtime library 935 may include, for example, a library module that a complier uses to add a new function through a programming language while the application 970 is running. The runtime library 935 may perform a function for input/output management, memory management, or an arithmetic function.

The application manager 941 may mange, for example, a life cycle of at least one application of the application 970. The window manager 942 may manage a graphical user interface (GUI) resource used in a screen. The multimedia manager 943 may recognize a format required for playing various media files and may encode or decode a media file using a codec matched to the format. The resource manager 944 may manage a resource such as source code, a memory, or a storage space of at least one application of the application 970.

The power manager 945, for example, may operate together with a basic input/output system (BIOS) to manage a battery or power and may provide power information required for operating the electronic device. The database manager 946 may generate, search, or modify a database to be used in at least one application of the application 970. The package manager 947 may manage the installation or an update of an application distributed in a package file format.

The connectivity manger 948 may manage a wireless connection of Wi-Fi, BT, or the like. The notification manager 949 may display or notify of an event such as a message arrival, appointments, and proximity alerts in such a manner as to not disturb a user. The location manager 950 may manage location information of the electronic device. The graphic manager 951 may manage a graphic effect to be provided to a user or a user interface related thereto. The security manager 952 may provide various security functions required for system security or user authentication. According to an embodiment of the present disclosure, in a case in which an electronic device includes a phone function, the middleware 930 may further include a telephony manager for managing a voice or video call function of the electronic device.

The middleware 930 may include a middleware module for forming a combination of various functions of the above-mentioned elements. The middleware 930 may provide a module specialized for each type of an OS to provide differentiated functions. Furthermore, the middleware 930 may delete a part of existing elements or may add new elements dynamically.

The API 960 is, for example, a set of API programming functions that may be provided in different configurations according to an OS. For example, in the case of Android or iOS, one API set may be provided for each platform, and, in the case of Tizen, at least two API sets may be provided for each platform.

The application 970, for example, may include at least one application capable of performing functions such as a home application 971, a dialer application 972, an SMS/MMS application 973, an instant messaging (IM) application 974, a browser application 975, a camera application 976, an alarm application 977, a contact application 978, a voice dial application 979, an e-mail application 980, a calendar application 981, a media player application 982, an album application 983, a clock application 984, a health care application (e.g., an application that measures an amount of exercise or a blood sugar level), or an environmental information provision application (e.g., an application that provides air pressure, humidity, or temperature information).

According to an embodiment of the present disclosure, the application 970 may include an information exchange application for supporting information exchange between the electronic device (e.g., the electronic device 701 in FIG. 7) and an external electronic device (e.g., the first electronic device 702 or the second external electronic device 704 in FIG. 7). The information exchange application may include, for example, a notification relay application for relaying certain information to the external electronic device or a device management application for managing the external electronic device.

For example, the notification relay application may have a function for relaying, to an external electronic device, notification information generated in another application (e.g., an SMS/MMS application 973, an e-mail application 980, a health care application, an environmental information application, and the like) of the electronic device. Furthermore, the notification relay application may receive notification information from the external electronic device and may provide the received notification information to the user.

The device management application, for example, may manage (e.g., install, delete, or update) at least one function (e.g., the turn-on/turn off of the external electronic device (or some elements) or the brightness (or resolution) adjustment of a display) of the external electronic device communicating with the electronic device, an application running in the external electronic device, or a service (e.g., a call service, a message service, and the like) provided from the external electronic device.

According to an embodiment of the present disclosure, the application 970 may include a certain application (e.g., a healthcare application of a mobile medical device) according to an attribute of the external electronic device. The application 970 may include an application received from an external electronic device. The application 970 may include a preloaded application or a third-party application downloadable from a server. The names of the elements of the program module 910 illustrated may vary with the type of OS.

According to an embodiment of the present disclosure, at least a part of the program module 910 may be implemented with software, firmware, hardware, or a combination thereof. At least a part of the program module 910, for example, may be implemented (e.g., executed) by a processor. At least a part of the program module 910 may include, for example, a module, a program, a routine, sets of instructions, or a process for performing at least one function.

Figure 10A:
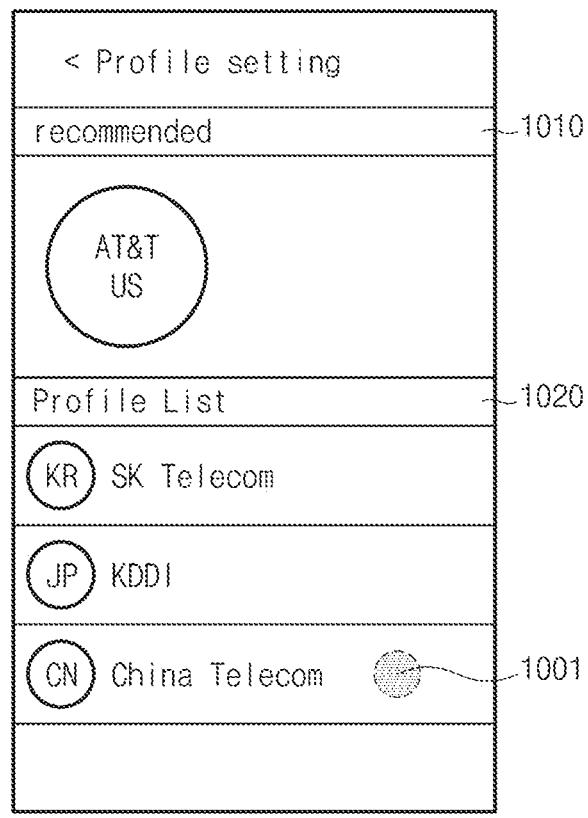
FIG. 10A illustrates a profile setting UI according to an embodiment.

FIG. 10A illustrates a profile setting UI according to an embodiment.

FIG. 10A may correspond to an exemplary profile setting UI applicable to various embodiments disclosed in the present disclosure. For example, FIG. 10A may be provided as a user interface screen of an electronic device 100 when performing an operation of determining a profile priority in FIG. 2, disabling a profile in FIG. 3, or enabling a profile in FIG. 4. For example, an LUI 142 of the electronic device 100 may output a UI like FIG. 10A on a display and may obtain a user input which is input on the UI.

Referring to FIG. 10A, according to an embodiment, the profile setting UI may include at least one of a recommended profile 1010 and a profile list 1020. For example, the profile setting UI may provide a profile, recommended based at least in part on a current location of the electronic device 100, a user preference, whether to enable a recent profile, or the like, as the recommended profile 1010. For example, when the electronic device 100 is currently located in the USA and when a profile of an AT&T operator is stored in an eUICC 130 of the electronic device 100, the profile setting UI may provide the profile of the AT&T operator as the recommended profile 1010.

The profile setting UI may provide profiles installed in the eUICC 130 as the profile list 1020. For example, other than the profile of the above-mentioned AT&T operator, a profile of a Korean SK Telecom operator, a profile of a Japanese KDDI operator, and a profile of a Chinese China Telecom operator are installed in the eUICC 130, the LUI 142 may provide the profiles on the profile list 1020. When a user input 1001 on the China Telecom occurs by a user, the electronic device 100 may enable the profile of the China Telecom operator.

Figure 10B:
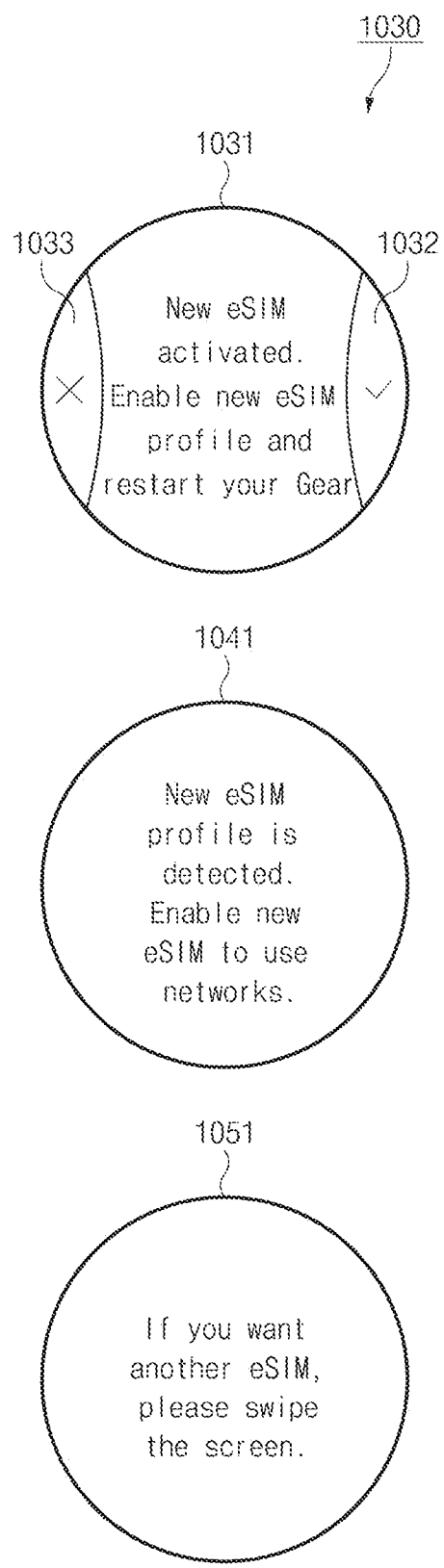
FIG. 10B illustrates a profile setting UI according to another embodiment.

FIG. 10B illustrates a profile setting UI according to another embodiment.

FIG. 10B may correspond to an exemplary profile setting UI applicable to when an electronic device 100 is a device loaded with a circular display, for example, a smart watch, or when an application of the electronic device 100 provides a circular UI. For example, FIG. 10B may be provided when a profile is enabled, disabled, or selected.

Referring to FIG. 10B, according to an embodiment, a message region 1031 of a UI screen 1030 may provide a description of a currently provided screen. For example, when a new SIM is currently enabled, a message for providing a notification, that the new SIM is enabled, of enabling a profile and rebooting a device (New eSIM activated. Enable new eSIM profile and restart your Gear) may be included in the message region 1031. A confirm region 1032 may receive approval of a user to the message, and a cancel region 1033 may receive a user input for canceling an operation corresponding to the message.

The message region 1031 may output another message depending on a situation. For example, when a new eSIM profile is detected, an information message 1031 may be output. Furthermore, when a profile is selected, an information message 1051 indicative of swiping a screen to the left/right to select the profile may be output. When a message output on the message region 1031 is changed, a screen configuration of the UI screen 1030 may be maintained. For example, although the information message 1041 is output on the message region 1031, the confirm region 1032 and the cancel region 1033 may be maintained without change like the UI screen 1030.

The term "module" used herein may represent, for example, a unit including one of hardware, software, firmware, or a combination thereof. The term "module" may be interchangeably used with the terms "unit", "logic", "logical block", "component" and "circuit". The term "module" may represent a minimum unit of an integrated component or may be a part thereof. The term "module" may represent a minimum unit for performing one or more functions or a part thereof. The term "module" may represent a device implemented mechanically or electronically. For example, the term "module" may represent a device that includes at least one of an application-specific integrated circuit (ASIC), a field-programmable gate array (FPGA), and a programmable-logic device for performing some operations, which are known or will be developed.

At least a part of devices (e.g., modules or functions thereof) or methods (e.g., operations) according to an embodiment of the present disclosure may be implemented as instructions stored in a non-transitory computer-readable storage medium in the form of a program module. In a case where the instructions are performed by a processor, the processor may perform functions corresponding to the instructions. The non-transitory computer-readable storage medium may be, for example, the memory 730 in FIG. 7.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. An electronic device, comprising:
    at least one processor,
    an eUICC configured to be electrically connected with the at least one processor and include a plurality of profiles;
    an RF circuit configured to communicate with a network using a first profile enabled among the plurality of profiles;
    a GPS circuit; and
    a memory storing a profile list database including information about the plurality of profiles,
    wherein the at least one processor is configured to implement a management module for managing the plurality of profiles, and
    wherein the management module is configured to:
    disable the first profile and enable a second profile among the plurality of profiles, based on location information obtained by the RF circuit or the GPS circuit,
    when there are two or more profiles corresponding to the location information, enable the second profile which meets a pre-defined criterion, and
    wherein the pre-defined criterion has the most voice or data usage among the two or more profiles corresponding to the location information.

2. The electronic device of claim 1, wherein the management module is configured to request information about a profile installed in the eUICC from the eUICC,
    wherein the eUICC is configured to provide the information about the plurality of profiles to the management module in response to the request, and
    wherein the management module is configured to store the profile list database in the memory based on the information about the plurality of profiles.

3. The electronic device of claim 2, wherein the information about the plurality of profiles comprises identification information of each profile, PLMN information of each profile, or state information indicating that each profile is enabled or disabled.

4. The electronic device of claim 1, wherein the profile list database comprises at least one of a preference of each of the plurality of profiles, voice call usage, data usage, or information about an expiration time.

5. The electronic device of claim 1, wherein the management module is configured to:
    request information about the first profile from a server, when a disable event of the first profile occurs;
    obtain the information about the first profile in response to the request; and
    update the profile list database based on the obtained information about the first profile.

6. The electronic device of claim 5, wherein the management module is configured to request the eUICC to disable the first profile, and
    wherein the eUICC is configured to disable the first profile in response to the request.

7. The electronic device of claim 1, wherein the location information corresponds to coordinate information obtained by the GPS circuit, and
    wherein information about the second profile stored in the profile list database comprises a country corresponding to the coordinate information.

8. The electronic device of claim 1, wherein the location information corresponds to PLMN information obtained by the RF circuit, and
    wherein information about the second profile stored in the profile list database comprises the PLMN information.

9. The electronic device of claim 1, wherein the management module is configured to deliver a command to disable the first profile and enable the second profile to the eUICC, and
    wherein the eUICC is configured to:
    disable the first profile;
    enable the second profile; and
    deliver information about the enabled second profile to the management module.

10. The electronic device of claim 1, wherein the management module is configured to enable the second profile having the highest priority among the two or more profiles corresponding to the location information.

11. The electronic device of claim 1, wherein the management module is configured to enable the second profile, an expiration time of which arrives first, among the two or more profiles corresponding to the location information.

12. A method for enabling a profile in an electronic device, the method comprising:
- obtaining location information of the electronic device;
- when the location information does not correspond to a first profile which is enabled in an eUICC of the electronic device, obtaining information about at least one profile corresponding to the location information from a memory of the electronic device, the memory being independent of the eUICC;
- selecting a second profile based on the information about the at least one profile obtained from the memory; and
- disabling the first profile and enabling the second profile among the at least one profile,
- wherein the information about the at least one profile comprises at least one of a priority for each profile or information about voice or data usage.

* * * * *